Figure 1:
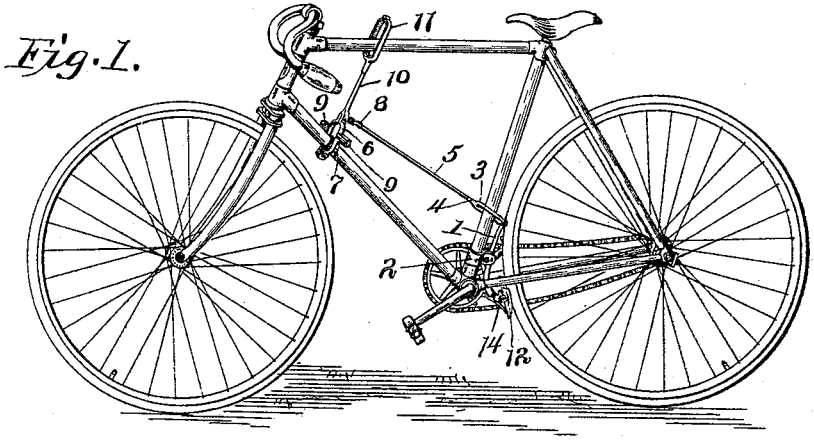

No. 619,395. Patented Feb. 14, 1899.
W. H. CROSSLEY.
BICYCLE BRAKE.
(Application filed May 22, 1897.)
(No Model.)

Witnesses
Howard W. Orr.
V. B. Hillyard.

Inventor
William H. Crossley,
By his Attorneys,
C. A. Snow & Co.

THE NORRIS PETERS CO., PHOTO-LITHO., WASHINGTON, D. C.

UNITED STATES PATENT OFFICE.

WILLIAM H. CROSSLEY, OF BLOOMSBURG, PENNSYLVANIA, ASSIGNOR OF ONE-HALF TO GEORGE W. MIFFLIN, OF SAME PLACE.

BICYCLE-BRAKE.

SPECIFICATION forming part of Letters Patent No. 619,395, dated February 14, 1899.

Application filed May 22, 1897. Serial No. 637,717. (No model.)

*To all whom it may concern:*

Be it known that I, WILLIAM H. CROSSLEY, a citizen of the United States, residing at Bloomsburg, in the county of Columbia and State of Pennsylvania, have invented a new and useful Bicycle-Brake, of which the following is a specification.

Brake apparatus as generally constructed for velocipedes, bicycles, and road-vehicles of kindred nature have the brake-shoe rigidly attached to its carrying arm or lever, whereby a quick movement of the operating-lever suddenly applies the brake, thereby resulting in a jar to the rider and machine alike and endangering the tire of the wheel, especially if the said tire be of the cushioned or pneumatic type.

One feature of the invention is to pivotally connect the brake-shoe to its lever or arm and interpose a spring between it and the said arm, whereby the full surface of the shoe is gradually brought into action, even though the operating-brake be suddenly actuated.

A further object of the invention is to provide adjustable connections between the component parts of the brake mechanism, whereby the latter can be adapted to a great variety of makes and styles of machines without necessitating cutting, welding, or brazing of the parts to fit the brake to a given machine, the parts being constructed with a view to lightness, simplicity, and efficiency.

Various other objects and advantages are contemplated and will appear in the course of the subjoined description, reference being had to the drawings hereto attached, in which corresponding and like parts are indicated by the same reference characters, and in the drawings—

Figure 2:
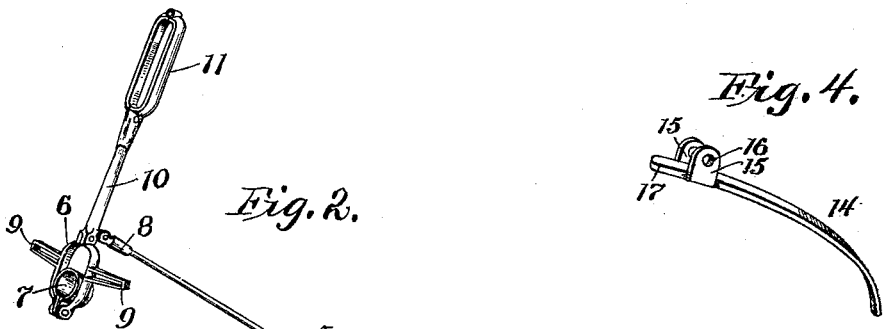
Figure 4:
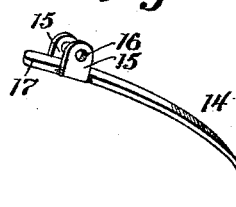
Figure 3:
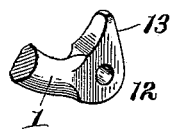
Figure 5:
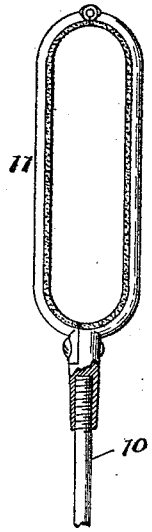

Figure 1 is a perspective view of a bicycle of the safety type having the improved brake mechanism applied thereto. Fig. 2 is a detail perspective view of the brake apparatus detached from the machine. Fig. 3 is a detail view of the end portion of the brake-lever carrying the shoe. Fig. 4 is a detail view of the spring which is interposed between the brake-shoe and its lever. Fig. 5 is a detail view of the loop having detachable and adjustable connection with the upper end of the operating-lever.

The brake-lever 1 has pivotal connection intermediate of its ends with a clip 2, by means of which it is attached to a frame-bar of the machine, which in the present instance is the seat-post tube. A link 3 has pivotal connection at one end with the brake-lever 1 and is provided at its opposite end with an internally-threaded sleeve 4, with which a rod 5 makes adjustable connection, the end portion of the said rod being threaded to screw into the sleeve 4. A link 6 has pivotal connection with a clip 7, secured to a frame-bar of the machine, and this link has adjustable connection with the rod 5 by means of a coupling 8, making screw-thread connection with the said rod in a manner similar to the adjustable connection between the parts 4 and 5. The link 6 has outwardly-extending arms 9, which form rests for the feet of the rider and act as coasters and provide means for setting the brake when the hands of the rider are otherwise occupied. A lever 10 is applied to the link 6 and is provided at its upper end with a loop 11, which is covered or padded to prevent injury to the frame-bar passing therethrough, and this loop is jointed to admit of its being readily fitted to the frame-bar or removed therefrom, as desired. The loop 11 is formed with a threaded sleeve to make adjustable connection with the lever 10. When the brake is to be operated by foot solely, the lever 10, with its loop 11, is omitted, the application of pressure to the arms 9 being sufficient to set the brake and check the speed of the machine.

The brake-shoe 12 is of the spoon type and is pivoted to the lower end of the brake-lever 1, the latter being provided with an extension 13, forming a stop to limit the movement of the brake-shoe in one direction. A spring 14 is secured at one end to the brake-lever 1 and its free end engages with the brake-shoe 12 and holds its lower end projected so as to engage with the wheel when first operating the brake-setting lever. This spring is formed with ears 15, which embrace the sides of the lever 1 and receive the pivot 16, by means of which the spring is held in place, and an extension 17 projects beyond the ears 15 to engage with the lever 1, so as to prevent the spring from turning on the pivot 16 and whereby it is held in place for effective service. When setting the brake, the lower end is first brought into engagement with the wheel, and the spring 14 yields so as to admit of the entire surface of the brake-shoe coming into active engagement with the wheel upon the application of sufficient force to the operating-lever to overcome the tension of the spring 14 and cause the brake-shoe to bear against the wheel with sufficient force to slow down the machine when required. The sleeve 4 and coupling 8 are provided with relatively right and left screw-threads to match with corresponding threads at the respective ends of the rod 5, so the latter can be lengthened and shortened by being turned in one or the other direction, as will be readily understood.

Changes in the form, proportion, and the minor details of construction may be resorted to without departing from the principle or sacrificing any of the advantages of this invention.

Having thus described the invention, what is claimed as new is—

1. In a brake apparatus for bicycles and the like, the combination of a lever operating in the space formed between the rear-fork sides and fulcrumed to the frame, and bearing a brake-shoe, an oblong link encircling the seat-post tube and having pivotal connection with the upper end of the said lever, a hand-operated lever having pivotal connection at its lower end with the lower reach-bar near its front end and having a loop at its upper end encircling the upper reach-bar, and a rod adjustably connecting the oblong link with the hand-operated lever, substantially as set forth.

2. In a brake apparatus for bicycles and the like, the combination of a lever bearing a shoe and fulcrumed to operate in the space formed between the rear-fork sides, a link pivoted to a clip applied to the lower reach-bar near its front end and encircling the said bar, and provided at its sides with outwardly-extending arms to receive the feet of the rider, a hand-lever having connection with the said link, and means connecting the link with the brake-lever, substantially as set forth.

3. The combination with a brake-lever, and a brake-shoe pivotally connected therewith, of a spring having ears pivotally connected to the brake-lever and having an extension projecting beyond the ears to engage with the brake-lever and hold the spring in working position, said spring serving to gradually bring the brake-shoe into action upon applying the brake, substantially as set forth.

In testimony that I claim the foregoing as my own I have hereto affixed my signature in the presence of two witnesses.

WILLIAM H. CROSSLEY.

Witnesses:
 JOHN H. SIGGERS,
 FRANCES PEYTON SMITH.